(12) United States Patent
Noh et al.

(10) Patent No.: US 8,406,803 B2
(45) Date of Patent: Mar. 26, 2013

(54) MULTI-CELL COMMUNICATION APPARATUS AND METHOD USING RATE-SPLITTING SCHEME AND TRANSMISSION FRAME

(75) Inventors: Won Jong Noh, Yongin-si (KR); Hyun Ho Choi, Suwon-si (KR); Won Jae Shin, Yongin-si (KR); Chang Yong Shin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 421 days.

(21) Appl. No.: 12/844,162

(22) Filed: Jul. 27, 2010

(65) Prior Publication Data
US 2011/0218000 A1    Sep. 8, 2011

(30) Foreign Application Priority Data
Mar. 5, 2010    (KR) .................. 10-2010-0020003

(51) Int. Cl.
*H04B 7/00*    (2006.01)
(52) U.S. Cl. ........ 455/522; 455/446; 455/447; 455/448; 455/449; 455/450; 370/315; 370/316; 370/317; 370/318; 370/319
(58) Field of Classification Search .............. 455/522, 455/69–70, 446–455; 370/315–320
See application file for complete search history.

(56) References Cited

U.S. PATENT DOCUMENTS
| | | |
|---|---|---|
| 2005/0070256 A1* | 3/2005 | Hu .................. 455/414.1 |
| 2007/0270151 A1 | 11/2007 | Claussen et al. |
| 2009/0131065 A1 | 5/2009 | Khandekar et al. |
| 2009/0186609 A1 | 7/2009 | Wu et al. |

FOREIGN PATENT DOCUMENTS
| | | |
|---|---|---|
| JP | 2008/252253 | 10/2008 |
| KR | 10-2009-0077821 | 7/2009 |

* cited by examiner

*Primary Examiner* — Fayyaz Alam
(74) *Attorney, Agent, or Firm* — NSIP Law

(57) ABSTRACT

Provided is a multi-cell communication system using a rate-splitting scheme and a transmission frame for the multi-cell communication system. The multi-cell communication system may determine whether to perform a rate-splitting based on channel information of a macro base station and a femto base station in a multi-cell environment. The multi-cell communication system may allocate a power or a bandwidth to a message to be transmitted based on the channel information. In the multi-cell environment, a terminal may receive MAP information from a base station and may decode the received MAP information, determining a base station that performs the rate-splitting.

24 Claims, 9 Drawing Sheets

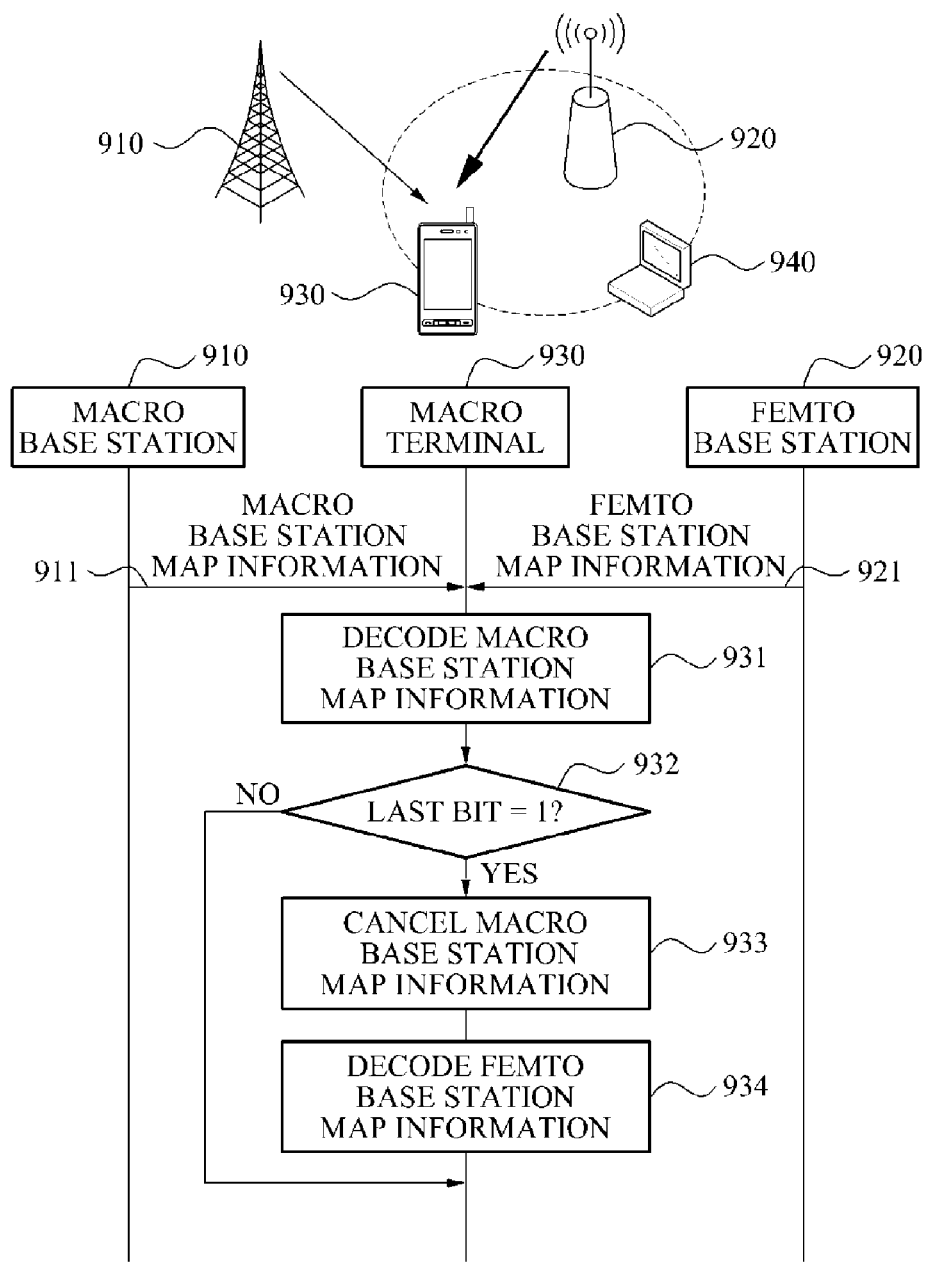

MULTI-CELL COMMUNICATION APPARATUS AND METHOD USING RATE-SPLITTING SCHEME AND TRANSMISSION FRAME

CROSS-REFERENCE TO RELATED APPLICATION(S)

This application claims the benefit under 35 U.S.C. §119 (a) of Korean Patent Application No. 10-2010-0020003, filed on Mar. 5, 2010, in the Korean Intellectual Property Office, the entire disclosure of which is incorporated herein by reference for all purposes.

BACKGROUND

1. Field

The following description relates to a method of adaptively performing a rate-splitting in a multi-cell interference environment 2. Description of Related Art A multi-cell communication system may have problems of a dead-zone and an inter-cell interference. The dead-zone and the inter-cell interference may decrease a signal-to-interference ratio (SINR), and thus may decrease a performance of an entire multi-cell communication system. A macrocell is a cell in a mobile phone network that provides radio coverage served by a power cellular base station (tower). The antennas for macrocells are mounted on ground-based masts, rooftops and other existing structures, high enough to provide a clear view over surrounding objects.

Recently, a communication technology that uses a small cell such as a femtocell has rapidly developed. A femtocell is a small cellular base station, typically designed for use in a home or small business. As new communication systems including the small cell are developed, research on technologies, such as interference alignment, dynamic spectrum management, interference control, etc., for interference control is continuously performed to develop schemes that overcome an interference occurring between the small cells or an interference occurring between the small cell and a macrocell. In addition, a technology that controls a topology of a network including a plurality of cells is also considered to be important. Examples of topologies of the network may include a bus type, a ring type, a star type, a tree type, a message type, etc.

SUMMARY

In one general aspect, there is provided a target base station in a multi-cell environment, the target base station including: a mode setting unit configured to set a rate-splitting mode based on channel information of the target base station and channel information of a neighbor base station, the rate-splitting mode configured to set a base station to use a rate-splitting scheme from among the target base station and the neighbor base station, and a power/bandwidth setting unit configured to allocate, based on the rate-splitting mode, a power or a bandwidth to at least one message.

The target base station may further include an inter-cell information exchanging unit configured to: transmit channel information of the target base station to the neighbor base station, and receive channel information of the neighbor base station from the neighbor base station.

The target base station may further include that the mode setting unit is further configured to set one of at least one candidate mode as the rate-splitting mode, the at least one candidate mode including at least one of four modes including: a first mode configured to indicate that both the target base station and the neighbor base station use the rate-splitting scheme, a second mode configured to indicate that only the neighbor base station uses the rate-splitting scheme, a third mode configured to indicate that only the target base station uses the rate-splitting scheme, and a fourth mode configured to indicate that both the target base station and the neighbor base station do not use the rate-splitting scheme.

The target base station may further include that: the channel information is calculated based on an interference-to-noise ratio (INR) and a signal-to-noise ratio (SNR), and the mode setting unit is further configured to set the rate-splitting mode to enable both the target base station and the neighbor base station to use the rate-splitting scheme in response to the channel information of the target base station and the channel information of the neighbor base station being greater than a predetermined value.

The target base station may further include that: the channel information is calculated based on an INR and an SNR, and the mode setting unit is further configured to set the rate-splitting mode to enable only the neighbor base station to use the rate-splitting scheme in response to the channel information of the target base station being greater than or equal to a sum of the channel information of the neighbor base station and a predetermined margin.

The target base station may further include that: the channel information is calculated based on an INR and an SNR, and the mode setting unit is further configured to set the rate-splitting mode to enable only the target base station to use the rate-splitting scheme in response to the channel information of the neighbor base station being greater than or equal to a sum of the channel information of the target base station and a predetermined margin.

The target base station may further include that: the channel information is calculated based on an INR and an SNR, and the mode setting unit is further configured to set the rate-splitting mode to enable both the target base station and the neighbor base station to not use the rate-splitting scheme in response to an absolute value of a difference between the channel information of the target base station and the channel information of the neighbor base station being less than or equal to a predetermined margin.

The target base station may further include that: the channel information is calculated based on an INR and an SNR, and the power/bandwidth setting unit is further configured to allocate, based on the channel information, a power or a bandwidth to the at least one message.

The target base station may further include a Quality of Service (QoS) setting unit configured to set a QoS of the target base station based on the channel information of the target base station and the channel information of the neighbor base station.

The target base station may further include a MAP generating unit configured to generate a transmission frame including MAP information including an indicator indicating the rate-splitting mode.

The target base station may further include that the MAP information further includes information associated with a modulation and coding scheme (MCS) level corresponding to each of the at least one message.

In another general aspect, there is provided a terminal in a multi-cell environment, the terminal including: a receiving unit configured to receive MAP information, the MAP information including an indicator configured to indicate a rate-splitting mode, the rate-splitting mode configured to set a base station to use a rate-splitting scheme from among a target base station and a neighbor base station, and a decoder configured to decode, based on the MAP information, at least one message transmitted from each of the target base station and the neighbor base station.

The terminal may further include that: the MAP information further includes information associated with an MCS level corresponding to each of the at least one message, and the decoder is further configured to decode the at least one message based on the information associated with the MSC level corresponding to each of the at least one message.

The terminal may further include an SNR and INR measuring unit configured to: calculate an SNR and an INR, and generate channel information of the target base station.

In another general aspect, there is provided a communication method in a multi-cell environment, the method including: setting a rate-splitting mode based on channel information of a target base station and channel information of a neighbor base station, the rate-splitting mode setting a base station to use a rate-splitting scheme from among the target base station and the neighbor base station, and allocating, based on the rate-splitting mode, a power or a bandwidth to at least one message.

The method may further include: transmitting channel information of the target base station to the neighbor base station, and receiving channel information of the neighbor base station from the neighbor base station.

The method may further include that: the channel information is calculated based on an INR and an SNR, and the setting sets the rate-splitting mode to enable both the target base station and the neighbor base station to use the rate-splitting scheme in response to the channel information of the target base station and the channel information of the neighbor base station being greater than a predetermined value.

The method may further include that: the channel information is calculated based on an INR and an SNR, and the setting sets the rate-splitting mode to enable only the neighbor base station to use the rate-splitting scheme in response to the channel information of the target base station being greater than or equal to a sum of the channel information of the neighbor base station and a predetermined margin.

The method may further include that: the channel information is calculated based on an INR and an SNR, and the setting sets the rate-splitting mode to enable only the target base station to use the rate-splitting scheme in response to the channel information of the neighbor base station being greater than or equal to a sum of the channel information of the target base station and a predetermined margin.

The method may further include that: the channel information is calculated based on an INR and an SNR, and the setting sets the rate-splitting mode to enable both the target base station and the neighbor base station to not use the rate-splitting scheme in response to a difference between the channel information of the target base station and the channel information of the neighbor base station being less than or equal to a predetermined margin.

The method may further include that: the channel information is calculated based on an INR and an SNR, and the allocating allocates, based on the channel information, a power or a bandwidth to the at least one message.

The method may further include setting a QoS of the target base station based on the channel information of the target base station and the channel information of the neighbor base station.

The method may further include generating a transmission frame including MAP information including an indicator indicating the rate-splitting mode.

The method may further include that the MAP information further includes information associated with an MCS level corresponding to each of the at least one message.

Other features and aspects may be apparent from the following detailed description, the drawings, and the claims.

BRIEF DESCRIPTION OF THE DRAWINGS

FIG. 9 is a flowchart illustrating an example of a decoding process of a terminal.

Figure 1:
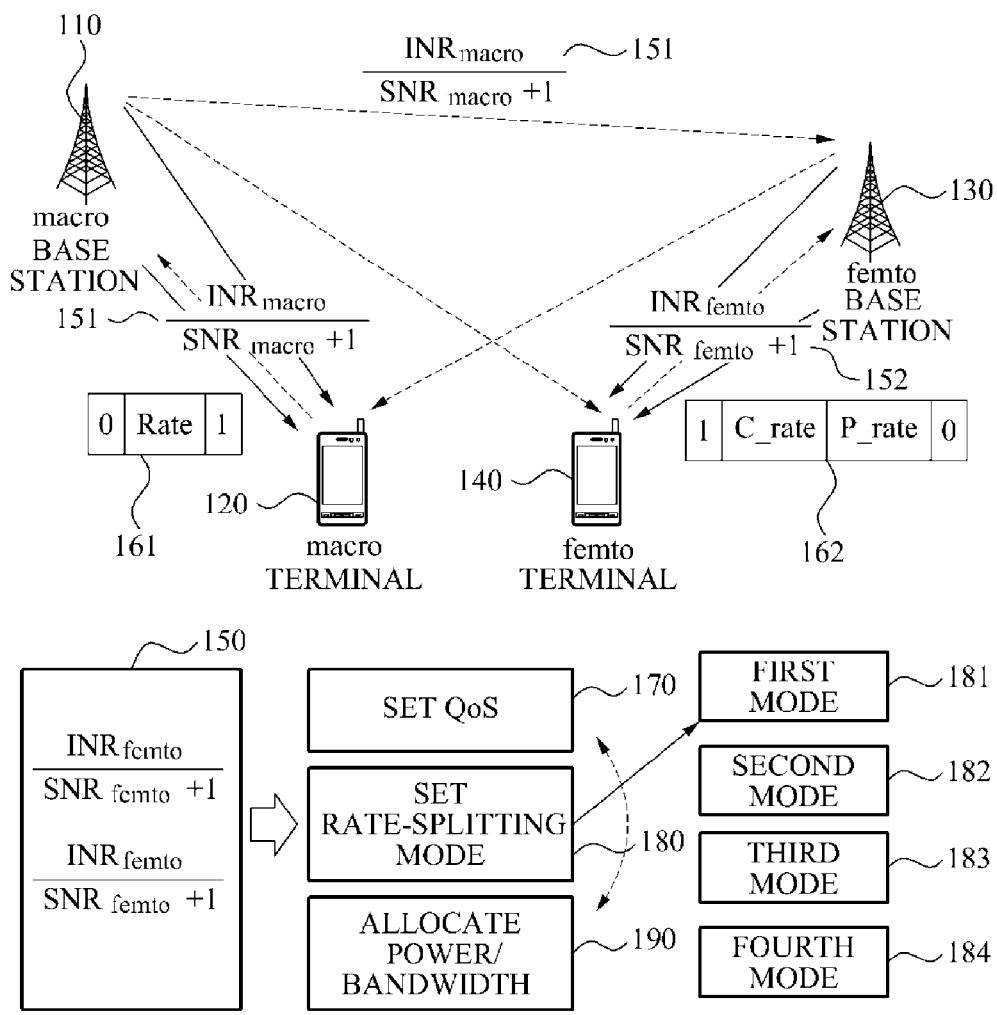
FIG. 1 is a diagram illustrating an example of a multi-cell communication system for an adaptive rate-splitting.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein may be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

FIG. 1 illustrates an example of a multi-cell communication system for an adaptive rate-splitting.

Referring to FIG. 1, the multi-cell communication system may include a macrocell and a femtocell. The macrocell may include a macro base station 110 and a macro terminal 120. The femtocell may include a femto base station 130 and a femto terminal 140.

Each of the macro terminal 120 and the femto terminal 140 may measure, for example, through a pilot channel, channel information associated with a channel gain of a terminal, an interference channel gain, a total amount of interference, a sum of noise, etc. The macro base station 110 and the femto base station 130 may be connected by a backhaul link. A data transmission route between base stations is referred to as a "backhaul link."

The multi-cell communication system may use a rate-splitting scheme. The rate-splitting scheme may divide a message into a common message and a private message based on an amplitude of a signal and an amplitude of an interference, and may transmit the message. Both a target terminal and a neighbor terminal may decode the common message. The private message may be decoded by the target terminal, and may not be decoded by the neighbor terminal, and thus, the private message may act as interference to the neighbor terminal. In other words, the neighbor terminal, which may not be intended to receive the private message, may interpret the private message as interference. According to the rate-splitting scheme that divided the message into the common message and the private message to transmit the message, the rate-splitting scheme may better reduce the interference when a detection of a message is performed, and thus, a signal-to-interference ratio (SINR) may increase and a high transmission rate may be obtained.

The macro base station 110 and the femto base station 130 may exchange the channel information respectively received from the macro terminal 120 and the femto terminal 140, and thus may share all channel information. Accordingly, each of the macro base station 110 and the femto base station 130 may set an optimal quality of service (QoS) and an optimal rate-splitting mode.

In one example, the channel information may be calculated based on an interference-to-noise ratio (INR) and a signal-to-noise ratio (SNR). For example, the channel information 150 may include a value, such as $$\frac{INR_{macro}}{SNR_{macro}+1} 151 \text{ and } \frac{INR_{femto}}{SNR_{femto}+1} 152.$$

$INR_{macro}$ denotes an INR of the macro terminal and $SNR_{macro}$ denotes a SNR of the macro terminal. $INR_{femto}$ denotes an INR of the femto terminal and $SNR_{femto}$ denotes a SNR of the femto terminal.

The rate-splitting mode may set a base station to use a rate-splitting scheme from among the target base station and the neighbor base station. When the macro base station 110 is the target base station, the femto base station 130 may be the neighbor base station. When the femto base station 130 is the target base station, the macro base station 110 may be the neighbor base station.

The rate-splitting mode may be determined as one of a plurality of candidate modes. The plurality of candidate modes may include a first mode 181, a second mode 182, a third mode 183, and a fourth mode 184.

In response to the rate-splitting mode being determined, one of the macro base station 110 and the femto base station 130 may be determined as the base station to use the rate-splitting scheme. In response to the base station to use the rate-splitting scheme from among the macro base station 110 and the femto base station 130 being determined, each of the macro base station 110 and the femto base station 130 may appropriately allocate a power and a bandwidth to a private message and a common message.

An indicator indicating the rate-splitting mode and information associated with the power and the bandwidth of the private message and the common message may be expressed by transmission frames 161 and 162 including MAP information. The transmission frames 161 and 162 including the MAP information will be described below.

Figure 2:
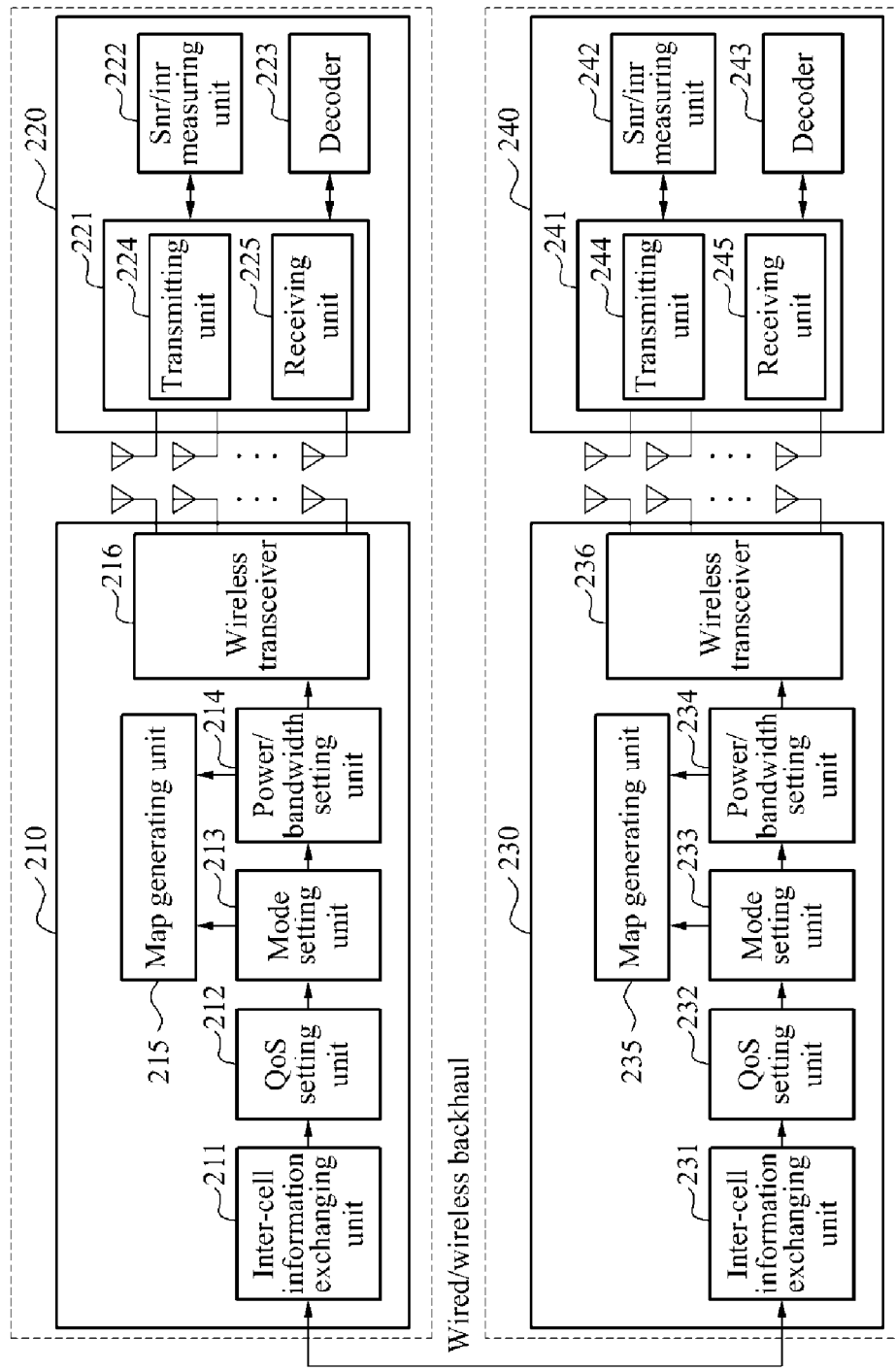
FIG. 2 is a block diagram illustrating an example of a multi-cell communication system for an adaptive rate-splitting.

FIG. 2 illustrates an example of a multi-cell communication system for an adaptive rate-splitting.

Referring to FIG. 2, a femto base station 210 of a femto cell may include an inter-cell information exchanging unit 211, a QoS setting unit 212, a mode setting unit 213, a power/bandwidth setting unit 214, an MAP generating unit 215, and a wireless transceiver 216.

A femto terminal or user 220 may include a transceiver 221 including a transmitting unit 224 and a receiving unit 225, an SNR/INR measuring unit 222, and a decoder 223.

A macro base station 230 of a macro cell may include, corresponding to elements of the femto base station 210, an inter-cell information exchanging unit 231, a Qos setting unit 232, a mode setting unit 233, a power/bandwidth setting unit 234, an MAP generating unit 235, and a wireless transceiver 236.

A macro terminal or user 240 may include a transceiver 241, including a transmitting unit 244 and a receiving unit 245, an SNR/INR measuring unit 242, and a decoder 243. The macro base station 230, the elements 211 through 216 of the macro base station 230, and the macro terminal 240 (and subelements thereof) may perform functions similar to corresponding functions of the femto base station 210, the elements 231 through 236, and the femto terminal 220 (and subelements thereof), respectively.

The inter-cell information exchanging unit 211 may transmit channel information of the femto base station 210 to the macro base station 230. The inter-cell information exchanging unit 211 may also receive channel information of the macro base station 230 from the macro base station 230. The inter-cell information exchanging unit 211 of the femto base station 210 and the inter-cell information exchanging unit 231 of the macro base station 230 may be connected by a high-speed link, such as a wired or wireless backhaul. In one example, channel information of the femto base station 210 transmitted by the inter-cell information exchanging unit 211 may be received from the femto terminal 220. The channel information of the femto base station 210 may include an INR/(SNR+1) value between the femto base station 210 and the femto terminal 220. The channel information of the macro base station 230 may include an INR/(SNR+1) value between the macro base station 230 and the macro terminal 240.

The femto base station 210 may directly listen in on the channel information of the macro base station 230 from the macro terminal 240 of the macro base station 230 without using the inter-cell information exchanging units 211 and 231.

The QoS setting unit 212 may set a QoS of the femto base station 210 based on the channel information of the femto base station 210 and the channel information of the macro base station 230.

Each of the femto base station 210 and the macro base station 230 may negotiate with respective corresponding femto terminal 220 and the corresponding macro terminal 240 for an amount of QoS to be provided, and may manage a negotiation result, for example, as a table. The amount of QoS provided to the respective corresponding femto terminal 220 and the macro terminal 240 of the femto base station 210 and the macro base station 230 may have an affinity with interference from an opponent terminal. For example, the opponent may be the macro terminal 240 or the femto terminal 240.

According to an embodiment, a level of a QoS of each base station may be determined based on channel information, and, for example, the level the QoS may be set as a function based on a difference between an INR/(SNR+1) value of each base station and an INR/(SNR+1) value of each terminal Examples are given in Table 1.

TABLE 1

| | QoS OF FEMTO TERMINAL | QoS OF MACRO TERMINAL |
|---|---|---|
| 0 < la-bl < 5 | 10 bps OR f(b) * 1 | 5 bps OR g(a) * 1 |
| 5 < la-bl < 10 | 7 bps OR f(b) * 0.7 | 3 bps OR g(a) * 0.6 |
| la-bl > 10 | 3 bps OR f(b) * 0.3 | 1 bps OR g(a) * 0.2 |

In Table 1, "a" denotes the INR/(SNR+1) value of the macro terminal 240, and "b" denotes the INR/(SNR+1) of the femto base station 220. Base stations may perform negotiation in a long-term and may include the QoS table in advance.

The mode setting unit 213 may set a rate-splitting mode defining a base station to use a rate-splitting scheme from among the femto base station 210 and the macro base station 230, based on the channel information of the femto base station 210 and the channel information of the macro base station 230. In one example, the channel information may include an INR/(SNR+1) value The power/bandwidth setting unit 214 may allocate a power or a bandwidth to at least one message based on the rate-splitting mode.

The MAP generating unit 215 may generate a transmission frame including MAP information including an indicator indicating the rate-splitting mode. In one example, the MAP information may further include information associated with a modulation and coding scheme (MCS) level corresponding to each of the at least one message that each base station transmits to each terminal.

The wireless transceiver 216 may transmit, to terminals, e.g., the femto terminal 220 and the macro terminal 240, a message or the transmission frame including the MAP information generated by the MAP generating unit 215, and may receive channel information, and the like, from the terminals.

The receiving unit of the transceiver 221 in the femto terminal 220 may receive MAP information including the indicator indicating the rate-splitting mode. In one example, the MAP information may further include information associated with an MCS level corresponding to each of the at least one message that each base station transmits to each terminal.

The decoder 230 of the femto terminal 220 may decode, based on the MAP information, the at least one message transmitted from each of the femto base station 210 or from the macro base station 230.

The SNR/INR measuring unit 222 of the femto terminal 220 may measure, through a pilot channel, channel information associated with, for example, a channel gain of the terminal 220, an interference channel gain, a total amount of interference, a sum of noise, an SNR, an INR, etc., and may transmit the channel information to the femto base station 210.

The channel information may include an INR/(SNR+1) value that may be based on an amplitude of an interference signal that the femto terminal 220 receives from the macro base station 230 and/or based on an amplitude of a signal that the femto terminal 220 receives from the femto base station 210. The INR/(SNR+1) value may be transmitted to the femto base station 210. The femto base station 210 may feed back the value to the macro base station 230 via the inter-cell information exchanging unit 211. When the INR/(SNR+1) value is used while the power and bandwidth are allocated, a QoS may be controlled by only a small amount of feedback information.

Figure 3:
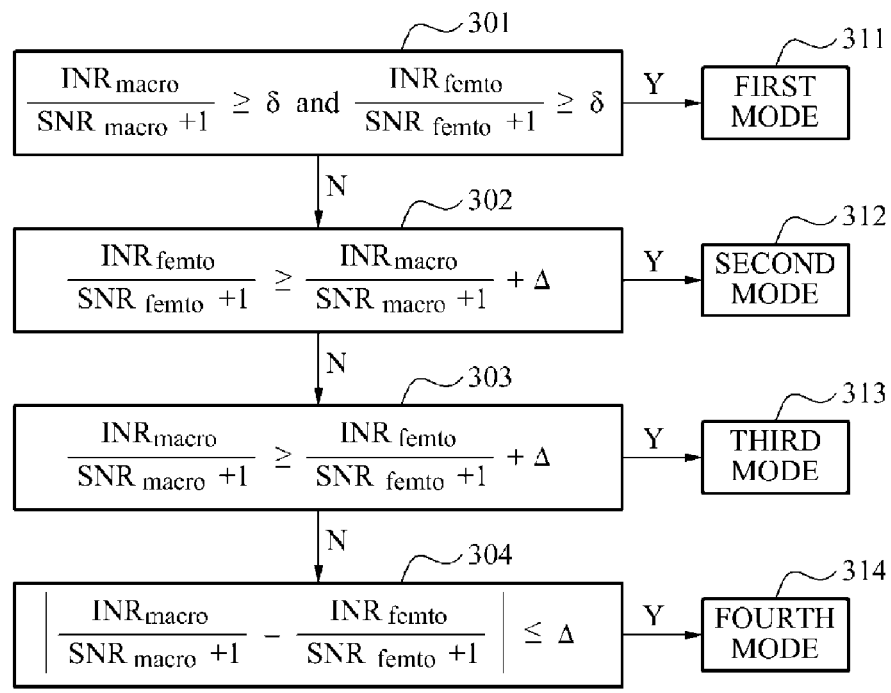
FIG. 3 is a diagram illustrating an example of a criterion for setting a rate-splitting mode of a mode setting unit of FIG. 2.

FIG. 3 illustrates an example of a condition for setting a rate-splitting mode of the mode setting unit of FIG. 2.

Referring to FIG. 3, a femto base station may compare an INR/(SNR+1) value of a macro base station received from the macro base station with an INR/(SNR+1) value of the femto base station. In response to the INR/(SNR+1) value of the femto base station being less than the value of the macro base station, it may indicate that the macro base station of a macro cell may receive relatively high interference. Thus, the femto base station may perform rate-splitting for a terminal of the macro cell. Similarly, when the INR/(SNR+1) value of the femto base station is greater than the value of the macro base station, rate-splitting may be performed for a terminal of the femto base station by the macro base station, as opposed to being performed by the femto base station.

A first mode 311 may indicate that both the femto base station and the macro base station perform the rate-splitting. The first mode 311 may correspond to an example in which both channel information $$\frac{INR_{macro}}{SNR_{macro} + 1}$$

of the macro base station and channel information $$\frac{INR_{femto}}{SNR_{femto} + 1}$$

of the femto base station are greater than or equal to a predetermined value δ, for example, a high (INR/SNR) index. The predetermined value δ may be a value determined in advance. Accordingly, the rate-splitting may be flexibly performed based on a channel environment or based on a desired QoS, and thus, a transmission performance and a reception performance may be improved.

The mode setting unit may determine whether the rate-splitting mode corresponds to the first mode, and, in response to the rate-splitting mode not corresponding to the first mode, it may be determined whether the rate-splitting mode corresponds to a second mode 312, based on the following example method.

The second mode 312 may indicate that only the macro base station uses the rate-splitting scheme. The second mode 312 may correspond to an example in which the channel information $$\frac{INR_{femto}}{SNR_{femto} + 1}$$

of the femto base station is greater than the channel information $$\frac{INR_{macro}}{SNR_{macro} + 1}$$

of the macro base station. A difference between the two channels may be greater than or equal to a predetermined margin Δ, for example, a decision margin. The margin Δ may be a value determined in advance. Accordingly, the rate-splitting may be flexibly performed based on a channel environment or based on a desired QoS. Thus, a transmission performance and a reception performance may be improved.

In response to the rate-splitting mode not corresponding to the second mode, the mode setting unit may determine whether the rate-splitting mode corresponds to a third mode 313 based on the following example method.

The third mode 313 may indicate that only the femto base station uses the rate-splitting scheme. The third mode 313 may correspond to an example in which the channel information $$\frac{INR_{macro}}{SNR_{macro}+1}$$

of the macro base station is greater than the channel information $$\frac{INR_{femto}}{SNR_{femto}+1}$$

of the femto base station. A difference between the two channel may be greater than or equal to the predetermined margin $\Delta$, for example, the decision margin. The margin $\Delta$ may be a value determined in advance. Accordingly, the rate-splitting may be flexibly performed based on a channel environment or based on a desired QoS. Thus, a transmission performance and a reception performance may be improved.

In response to the rate-splitting mode not corresponding to the third mode, the mode setting unit may determine whether the rate-splitting mode corresponds to a fourth mode 314 based on the following example method.

The fourth mode 314 may indicate that both the femto base station and the macro base station do not use the rate-splitting scheme. The fourth mode 314 may correspond to an example in which an absolute value of a difference between the channel information $$\frac{INR_{femto}}{SNR_{femto}+1}$$

of the femto base station and the channel information $$\frac{INR_{macro}}{SNR_{macro}+1}$$

of the macro base station is less than the predetermined margin $\Delta$, for example, the decision margin. The margin $\Delta$ may be a value determined in advance. Accordingly, the rate-splitting may be flexibly performed based on a channel environment or based on a desired QoS. Thus, a transmission performance and a reception performance may be improved. The margin $\Delta$ used for each of the first through fourth modes may be different from each other.

Figure 4:
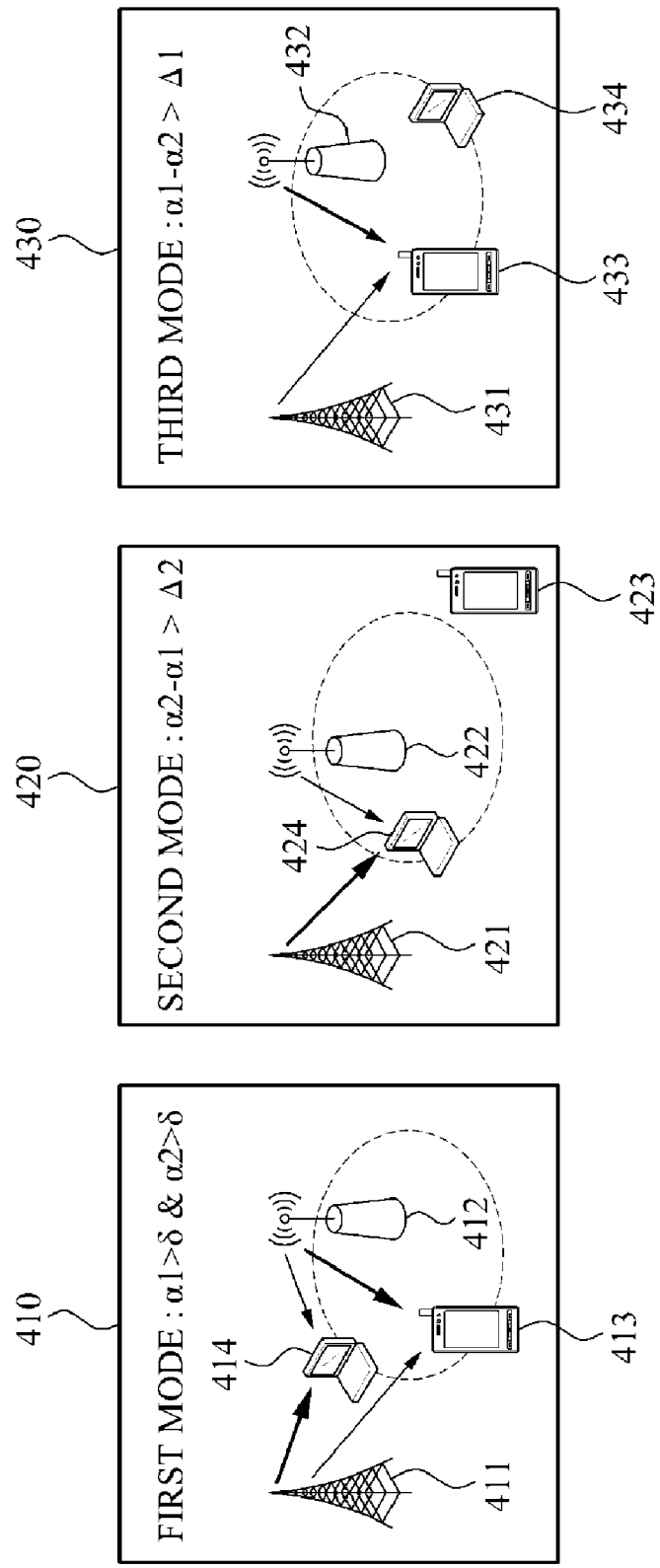
FIG. 4 is a diagram illustrating an example where each of a femto base station and a macro base station transmits a rate-split message to a femto terminal and a macro terminal, based on a rate-splitting mode.

FIG. 4 illustrates an example where each of a femto base station and a macro base station transmits a rate-split message to a femto terminal and a macro terminal, based on a rate-splitting mode.

$\alpha 1$ denotes channel information $$\frac{INR_{macro}}{SNR_{macro}+1}$$

of a macro base station, and $\alpha 2$ denotes channel information $$\frac{INR_{femto}}{SNR_{femto}+1}$$

or a femto base station. A rate-split message may be indicated by a bold arrow.

Referring to FIG. 4, a first mode 410 illustrates an example in which both a terminal 414 of a femto base station 412 and a terminal 413 of a macro base station 411 exist in a dead zone. Accordingly, both the femto base station 412 and the macro base station 411 may perform a rate-splitting for their opponent terminals.

A second mode 420 illustrates an example in which only a terminal 424 of a femto base station 422 exists in the dead zone. A terminal 423 of a macro base station 421 may be located outside a cell area of the femto base station, and may not be included in the dead zone. Accordingly, only the macro base station 421 may perform the rate-splitting for the terminal 423 of the femto base station 422.

A third mode illustrates an example in which only a terminal 433 of a macro base station 431 exists in the dead zone. A terminal 434 of the femto base station 432 may be located outside a cell area of the femto base station 432, and may not be included in the dead zone. Accordingly, only the femto base station 432 may perform the rate-splitting for the terminal 433 of the macro base station 431.

Figure 5:
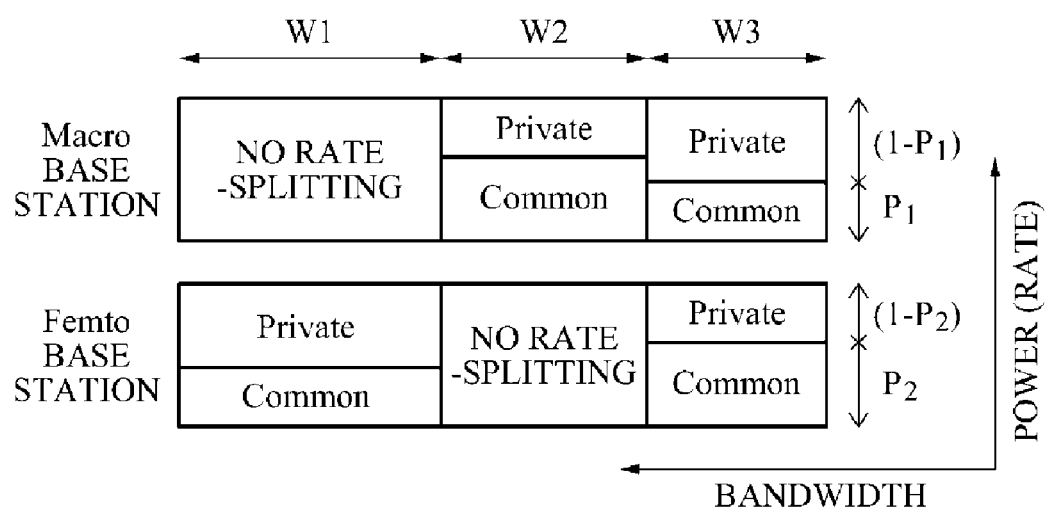
FIG. 5 is a diagram illustrating an example where a power and a bandwidth of a message transmitted by each of a femto base station and a macro base station is divided based on a rate-splitting mode.

FIG. 5 illustrates an example in which a power and a bandwidth of a message transmitted by each of a femto base station and a macro base station is divided based on a rate-splitting mode.

Referring to FIG. 5, a base station that may perform a rate-splitting may determine an amount of power to be allocated to a common message and an amount of power to be allocated to a private message, for a terminal of the corresponding base station. A base station that does not use the rate-splitting may use all received power to generate a private message.

A bandwidth of W1 may denote a third mode in which only a femto base station may perform the rate-splitting while a macro base station does not perform the rate-splitting. In one example, in the bandwidth of W1, a ratio between a power of a private message and a power of a common message of the femto base station may be expressed by a ratio of an area denoted "private" and an area denoted "common" of FIG. 5. A bandwidth of W2 denotes a second mode in which only the macro base station may perform the rate splitting, and a bandwidth of W3 denotes a first mode where both the macro base station and the femto base station perform the rate-splitting.

Table 2 denotes an example of an equation for calculating an amount of power that a base station may allocate to a common message and a private message according to an embodiment.

TABLE 2

Macro base station rate-split $$P_{1,common} = \frac{\left(\frac{SNR_2+1}{INR_2}+1\right)\left(\frac{INR_1+1}{SNR_1}+1-(1+SINR_{macro}^{target})\left(\frac{INR_1+1}{SNR_1}\right)\right)}{\left(\frac{SNR_2+1}{INR_2}+1\right)-(1+SINR_{macro}^{target})\left(\frac{INR_1+1}{SNR_1}\right)} \cdot P_1$$

$P_{1,private} = P_1 - P_{1,common}$
Femto base station rate-split

TABLE 2-continued $$P_{2,common} = \frac{\left(\frac{SNR_1+1}{INR_1}+1\right)\left(\frac{INR_2+1}{SNR_2}+1-(1+SINR_{macro}^{target})\left(\frac{INR_2+1}{SNR_2}\right)\right)}{\left(\frac{SNR_1+1}{INR_1}+1\right)-(1+SINR_{macro}^{target})\left(\frac{INR_2+1}{SNR_2}\right)} \cdot P_2$$

$$P_{2,private} = P_2 - P_{2,common}$$

Each base station may allocate a power to a private message and a common message based on the equations in Table 2. The power allocated to each of the private message and the common message may be satisfied with a target QoS of a corresponding terminal and minimize interference to another terminal. A base station may determine the power to be allocated to each of the private message and the common message only based on information associated with an INR/(SNR+1).

$P_1$ denotes a total power of a message of the macro base station, and $P_2$ denotes a total power of a message of the femto base station. $P_{1,common}$ denotes a power of a common message of the macro base station, and $P_{1,private}$ denotes a power of a private message of the macro base station. $P_{2,common}$ denotes a power of a common message of the femto base station, and $P_{2,private}$ denotes a power of a private message of the femto base station.

Table 3 denotes an example of an equation for calculating a bandwidth of each message according to an embodiment.

TABLE 3

BASED ON QoS OF MACRO TERMINAL $$\frac{w_1}{w_2} = \frac{R_{macro}^{target}\log\left(1+\frac{1}{(1+\alpha_1)\frac{1}{SNR_2}+(1-\alpha_1)\frac{(1+INR_2)}{SNR_2}}\right)}{R_{macro}^{target}\log\left(1+\frac{1}{(1+\alpha_2)\frac{1}{SNR_1}+(1-\alpha_2)\frac{(1+INR_1)}{SNR_1}}\right)}$$

If, $INR_P = 1$ $$\frac{W_1}{W_2} \approx \frac{R_{macro}^{target}(\log(SNR_{femto})+\log(3))}{R_{macro}^{target}(\log(SNR_{macro})+\log(3))} \approx \frac{R_{macro}^{target} \cdot \log(SNR_{femto})}{R_{macro}^{target} \cdot \log(SNR_{macro})}$$

Table 3 is associated with an allocation of a bandwidth in a first mode where both the femto base station and the macro base station perform rate-splitting. Table 3 denotes an example of an equation indicating how each of the femto base station and the macro base station may orthogonally split to avoid interference from an opponent terminal while transmitting a message to a corresponding terminal.

Figure 6:
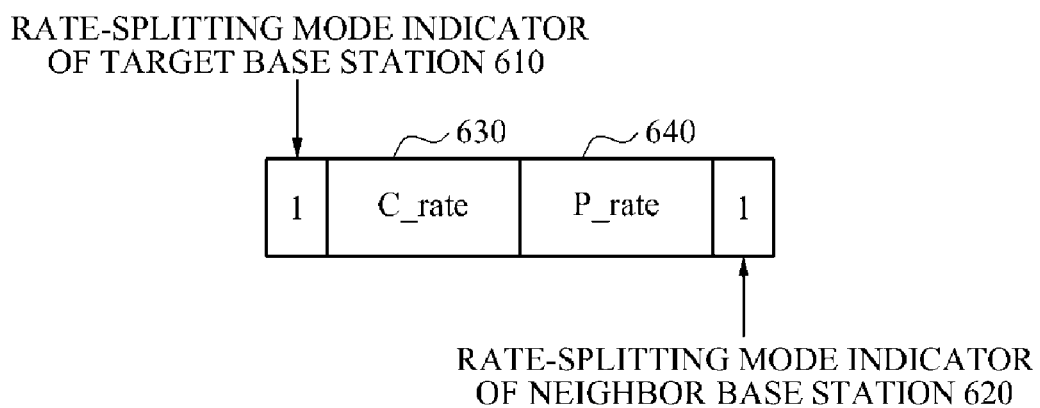
FIG. 6 is a diagram illustrating a transmission frame including MAP information.

FIG. 6 illustrates a transmission frame including MAP information.

Referring to FIG. 6, a femto base station may generate a transmission frame including MAP information as illustrated in FIG. 6. A first bit 610 of the transmission frame including the MAP information may be an indicator indicating whether a message transmitted from the femto base station is rate-split. In response to the first bit 610 being 1, subsequent bits 630 and 640 may include information associated with an MCS level indicating how a common message and a private message of the femto base station is modulated and coded. A last bit 620 may be an indicator indicating whether data to be received from a macro base station is rate-split. The last bit 620 may indicate the rate-splitting mode of a neighbor base station.

Figure 7:
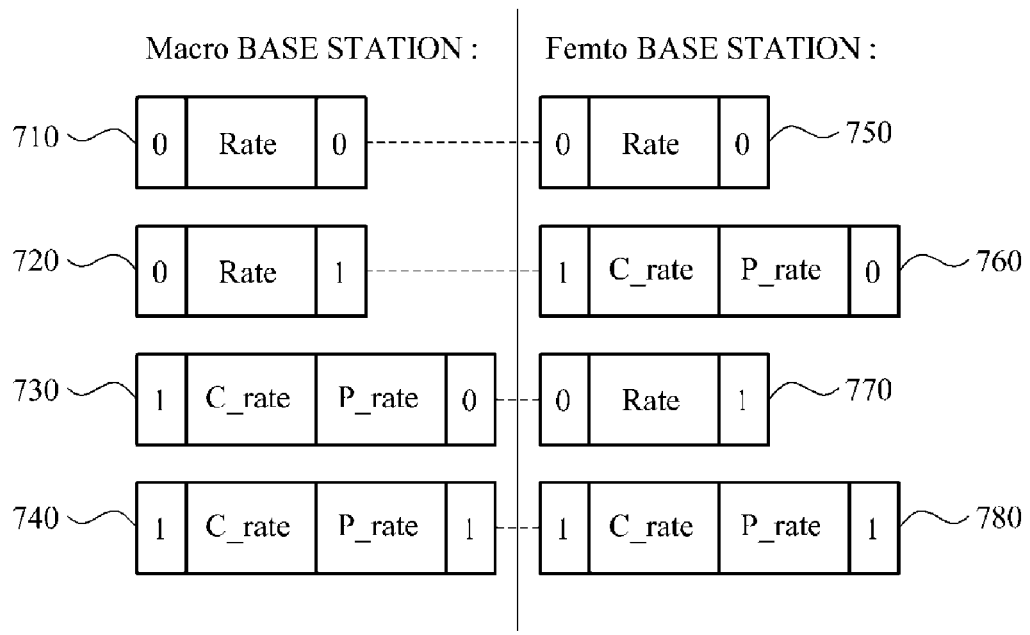
FIG. 7 is a diagram illustrating a configuration of a transmission frame including MAP information for each rate-splitting mode.

FIG. 7 illustrates a configuration of a transmission frame including MAP information for each rate-splitting mode.

Referring to FIG. 7, a fourth mode may include a combination of a transmission frame 710 and a transmission frame 750, a third mode may include a combination of a transmission frame 720 and a transmission frame 760, a second mode may include a combination a transmission frame 730 and a transmission frame 770, and a first mode may include a combination a transmission frame 740 and a transmission frame 780.

Figure 8:
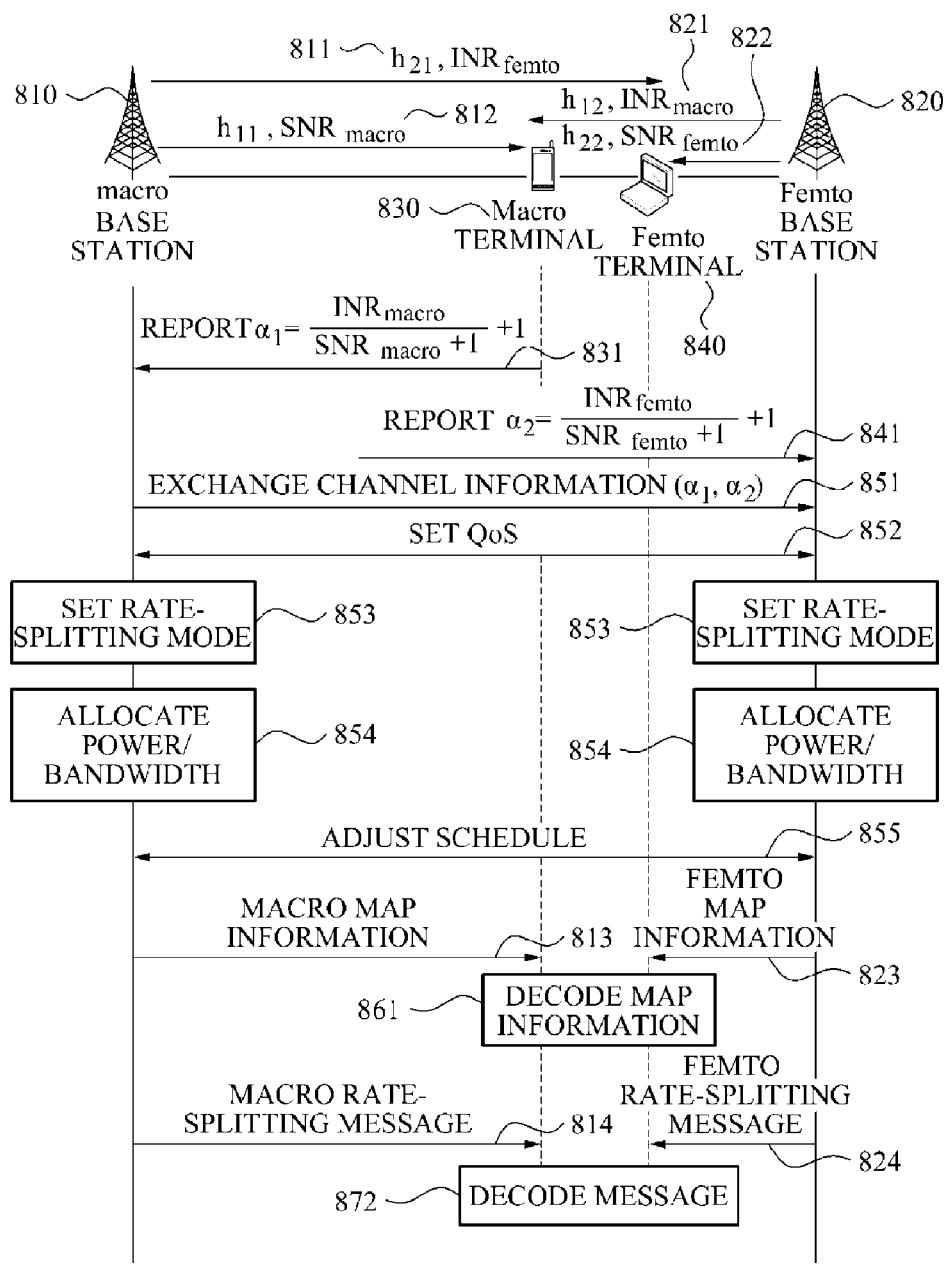
FIG. 8 is a flowchart illustrating an example where a multi-cell communication method uses a rate-splitting scheme.

FIG. 8 illustrates an example where a multi-cell communication method uses a rate-splitting scheme.

Referring to FIG. 8, each of a macro base station 810 and a femto base station 820 may transmit a pilot signal, for example, pilot signals 811 and 812 from the macro base station 810, and pilot signals 821 and 822 from the femto base station 820, to a respective macro terminal 830 and femto terminal 840. In operation 831, the macro terminal 830 may transmit channel information $$\alpha_1 = \frac{INR_{macro}}{SNR_{macro}+1}$$

to the macro base station 810 based on signals received from the macro base station 810 and the femto base station 820. In operation 841, the femto terminal 840 may transmit channel information $$\alpha_2 = \frac{INR_{femto}}{SNR_{femto}+1}$$

to the femto base station 820.

In operation 851, the macro base station 810 and the femto base station 820 may exchange the received channel information with each other. In operation 852, the macro base station 810 may set a QoS with respect to the macro terminal 830 and the femto base station 820 may set a QoS with respect to the femto terminal 840.

Each of the macro base station 810 and the femto base station 820 may set a rate-splitting mode based on the channel information. The rate-splitting mode may set a base station to use a rate-splitting scheme from among the macro base station 810 or the femto base station 820.

In operation 854, each of the macro base station 810 and the femto base station 820 may allocate a power and a bandwidth to at least one message based on the channel information and the rate-splitting mode. In operation 855, each of the macro base station 810 and the femto base station 820 may adjust a scheduling.

Each of the macro base station 810 and the femto base station 820 may generate a transmission frame including MAP information including an indicator indicating the rate-splitting mode. In one example, the MAP information may further include information associated with an MCS level corresponding to each of at least one message that the macro base station 810 transmits to the macro terminal 830, and the femto base station 820 transmits to the femto terminal 840.

In operation 813, the macro base station 810 may transmit the transmission frame including the MAP information to the macro terminal 830. In operation 823, the femto base station 820 may transmit the transmission frame including the MAP information to the femto base terminal 840.

In operation 861, each of the macro terminal 830 and the femto terminal 840 may decode the received transmission frame including the MAP information. Therefore, each of the macro terminal 830 and the femto terminal 840 may recognize a base station that performs rate splitting and a base station that transmits a message without performing the rate-splitting.

In operation 814, the macro base station 810 may transmit at least one message generated based on the rate-splitting mode to the macro terminal 830. In operation 824, the femto base station 820 may transmit at least one message generated based on the rate-splitting mode to the femto base station 840. In operation 872, each of the macro terminal 830 and the femto terminal 840 may receive the message and may decode the message based on the MAP information.

rate-splitting, and thus, the MAP information decoding may be terminated.

Each of the macro terminal 930 and the femto terminal 940 may determine whether the rate-splitting is performed only based on two bits, e.g., bits 610 and 620 of FIG. 6. Even when a transmission rate of a neighbor cell is changed during the rate-splitting, each of the macro terminal 930 and the femto terminal 940 may not need to receive information associated with the transmission rate change.

Table 4 denotes a comparison between features of a multi-cell communication system using a rate-splitting scheme with a conventional system.

TABLE 4

| Classification | HK [1] | MLRC [2] | MLRC [2] |
|---|---|---|---|
| Terminal Feedback | |H_cross| | SINR of Its own signal<br>SINR of Interference Common<br>SINR of Interference Private<br>Power-Split Ratio | ISNR |
| Backhaul Feedback | |H_cross| | SINR of Interference Common<br>Power-Split Ratio | ISNR |
| Downlink Control Overhead | None | Power-Split Ratio | None |
| Operation Policy | None | Rate-Split based on qos of opponent terminal | Rate-Split based on qos of opponent terminal |
| Rate-Split Scheme | Rate-split in both side | Rate-Split in one side | Hybrid Rate-Split |
| Framework | INR_P = 1 | None | Rate-Split mode decision<br>Rate-Split MAP |
| Performance | provide optimal sum-rate which is within one-bit<br>Individual user may not control rate | Being similar to an optimal when Rate-Splitting in one side | Being superior than MLRC in some section<br>Being superior than HK in some section<br>more flexibly control terminal rate compared with MLRc and HK |

FIG. 9 illustrates an example of a decoding process of a terminal, for example, a macro terminal.

Referring to FIG. 9, in operation 921, a macro terminal 930 may receive a transmission frame including macro base station MAP information in operation 911 or receive a transmission frame including femto base station MAP information from a femto base station 920. The femto base station and the macro base station may synchronize to simultaneously transmit the transmission frames including the MAP information. The macro terminal 930 may perform decoding and canceling of the transmission frame including the MAP information of a corresponding cell in advance, and may decode the transmission frame including the MAP information of a neighbor cell. Accordingly, in operation 932, information associated with whether the macro base station 910 may perform rate-splitting and information associated with an MCS level may be obtained by decoding the transmission frame including MAP information of the macro base station 910.

In one example, in operation 932, it may be determined whether a last bit of MAP information of the macro base station 910 is "1". When the last bit is "1", it may indicate that the femto base station 920 may perform the rate-splitting. In operation 933, the macro terminal may cancel the transmission frame including MAP information of the macro base station 910. In operation 934, the macro terminal may decode the transmission frame, including the MAP information of the femto base station 920.

When the last bit of the transmission frame including MAP information of the macro base station 910 is not "1", it may indicate that the femto base station 920 may not perform the A communication method in a multi-cell environment has been described. The communication method may be implemented based on various embodiments with reference to FIGS. 1 through 8.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, and an MP3 player, a portable/personal multimedia player (PMP), a handheld e-book, a portable laptop and/or tablet PC, a global positioning system (GPS) navigation, and devices such as a desktop PC, a high definition television (HDTV), an optical disc player, a setup box, and the like capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

Flash memory devices and/or memory controllers may be included in various types of packages. For example, the flash memory devices and/or memory controllers may be embodied using packages such as Package on Packages (PoPs), Ball Grid Arrays (BGAs), Chip Scale Packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Quad Flatpack (QFP), Small Outline Integrated Circuit (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP), and the like.

The flash memory devices and/or the memory controllers may constitute memory cards. In this case, the memory controllers may be constructed to communicate with an external device for example, a host using any one of various types of interface protocols such as a Universal Serial Bus (USB), a Multi Media Card (MMC), a Peripheral Component Interconnect-Express (PCI-E), Serial Advanced Technology Attachment (SATA), Parallel ATA (PATA), Small Computer System Interface (SCSI), Enhanced Small Device Interface (ESDI), and Integrated Drive Electronics (IDE).

The flash memory devices may be non-volatile memory devices that can maintain stored data even when power is cut off. According to an increase in the use of mobile devices such as a cellular phone, a personal digital assistant (PDA), a digital camera, a portable game console, and an MP3 player, the flash memory devices may be more widely used as data storage and code storage. The flash memory devices may be used in home applications such as a high definition television (HDTV), a DVD, a router, and a Global Positioning System (GPS).

A number of example embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A target base station in a multi-cell environment, the target base station comprising:
   a mode setting unit configured to set a rate-splitting mode based on channel information of the target base station and channel information of a neighbor base station, the rate-splitting mode configured to set a base station to use a rate-splitting scheme from among the target base station and the neighbor base station; and
   a power/bandwidth setting unit configured to allocate, based on the rate-splitting mode, a power or a bandwidth to at least one message.

2. The target base station of claim 1, further comprising an inter-cell information exchanging unit configured to:
   transmit channel information of the target base station to the neighbor base station; and
   receive channel information of the neighbor base station from the neighbor base station.

3. The target base station of claim 1, wherein the mode setting unit is further configured to set one of at least one candidate mode as the rate-splitting mode, the at least one candidate mode comprising at least one of four modes comprising:
   a first mode configured to indicate that both the target base station and the neighbor base station use the rate-splitting scheme;
   a second mode configured to indicate that only the neighbor base station uses the rate-splitting scheme;
   a third mode configured to indicate that only the target base station uses the rate-splitting scheme; and
   a fourth mode configured to indicate that both the target base station and the neighbor base station do not use the rate-splitting scheme.

4. The target base station of claim 1, wherein:
   the channel information is calculated based on an interference-to-noise ratio (INR) and a signal-to-noise ratio (SNR); and
   the mode setting unit is further configured to set the rate-splitting mode to enable both the target base station and the neighbor base station to use the rate-splitting scheme in response to the channel information of the target base station and the channel information of the neighbor base station being greater than a predetermined value.

5. The target base station of claim 1, wherein:
   the channel information is calculated based on an INR and an SNR; and
   the mode setting unit is further configured to set the rate-splitting mode to enable only the neighbor base station to use the rate-splitting scheme in response to the channel information of the target base station being greater than or equal to a sum of the channel information of the neighbor base station and a predetermined margin.

6. The target base station of claim 1, wherein:
   the channel information is calculated based on an INR and an SNR; and
   the mode setting unit is further configured to set the rate-splitting mode to enable only the target base station to use the rate-splitting scheme in response to the channel information of the neighbor base station being greater than or equal to a sum of the channel information of the target base station and a predetermined margin.

7. The target base station of claim 1, wherein:
the channel information is calculated based on an INR and an SNR; and
the mode setting unit is further configured to set the rate-splitting mode to enable both the target base station and the neighbor base station to not use the rate-splitting scheme in response to an absolute value of a difference between the channel information of the target base station and the channel information of the neighbor base station being less than or equal to a predetermined margin.

8. The target base station of claim 1, wherein:
the channel information is calculated based on an INR and an SNR; and
the power/bandwidth setting unit is further configured to allocate, based on the channel information, a power or a bandwidth to the at least one message.

9. The target base station of claim 1, further comprising a Quality of Service (QoS) setting unit configured to set a QoS of the target base station based on the channel information of the target base station and the channel information of the neighbor base station.

10. The target base station of claim 1, further comprising a MAP generating unit configured to generate a transmission frame comprising MAP information comprising an indicator indicating the rate-splitting mode.

11. The target base station of claim 10, wherein the MAP information further comprises information associated with a modulation and coding scheme (MCS) level corresponding to each of the at least one message.

12. A terminal in a multi-cell environment, the terminal comprising:
a receiving unit configured to receive MAP information, the MAP information comprising an indicator configured to indicate a rate-splitting mode, the rate-splitting mode configured to set a base station to use a rate-splitting scheme from among a target base station and a neighbor base station; and
a decoder configured to decode, based on the MAP information, at least one message transmitted from each of the target base station and the neighbor base station.

13. The terminal of claim 12, wherein:
the MAP information further comprises information associated with an MCS level corresponding to each of the at least one message; and
the decoder is further configured to decode the at least one message based on the information associated with the MSC level corresponding to each of the at least one message.

14. The terminal of claim 12, further comprising an SNR and INR measuring unit configured to:
calculate an SNR and an INR; and
generate channel information of the target base station.

15. A communication method in a multi-cell environment, the method comprising:
setting a rate-splitting mode based on channel information of a target base station and channel information of a neighbor base station, the rate-splitting mode setting a base station to use a rate-splitting scheme from among the target base station and the neighbor base station; and
allocating, based on the rate-splitting mode, a power or a bandwidth to at least one message.

16. The method of claim 15, further comprising:
transmitting channel information of the target base station to the neighbor base station; and
receiving channel information of the neighbor base station from the neighbor base station.

17. The method of claim 15, wherein:
the channel information is calculated based on an INR and an SNR; and
the setting sets the rate-splitting mode to enable both the target base station and the neighbor base station to use the rate-splitting scheme in response to the channel information of the target base station and the channel information of the neighbor base station being greater than a predetermined value.

18. The method of claim 15, wherein:
the channel information is calculated based on an INR and an SNR; and
the setting sets the rate-splitting mode to enable only the neighbor base station to use the rate-splitting scheme in response to the channel information of the target base station being greater than or equal to a sum of the channel information of the neighbor base station and a predetermined margin.

19. The method of claim 15, wherein:
the channel information is calculated based on an INR and an SNR; and
the setting sets the rate-splitting mode to enable only the target base station to use the rate-splitting scheme in response to the channel information of the neighbor base station being greater than or equal to a sum of the channel information of the target base station and a predetermined margin.

20. The method of claim 15, wherein:
the channel information is calculated based on an INR and an SNR; and
the setting sets the rate-splitting mode to enable both the target base station and the neighbor base station to not use the rate-splitting scheme in response to a difference between the channel information of the target base station and the channel information of the neighbor base station being less than or equal to a predetermined margin.

21. The method of claim 15, wherein:
the channel information is calculated based on an INR and an SNR; and
the allocating allocates, based on the channel information, a power or a bandwidth to the at least one message.

22. The method of claim 15, further comprising setting a QoS of the target base station based on the channel information of the target base station and the channel information of the neighbor base station.

23. The method of claim 15, further comprising generating a transmission frame comprising MAP information comprising an indicator indicating the rate-splitting mode.

24. The method of claim 23, wherein the MAP information further comprises information associated with an MCS level corresponding to each of the at least one message.

* * * * *